(12) United States Patent
Huang

(10) Patent No.: US 6,785,896 B2
(45) Date of Patent: Aug. 31, 2004

(54) LOCKING MECHANISM OF EXTERNAL OPTICAL DISK DRIVE

(75) Inventor: Hui-Chu Huang, Taipei (TW)

(73) Assignee: Lite-On It Corporation, Taipei (TW)

( * ) Notice: Subject to any disclaimer, the term of this patent is extended or adjusted under 35 U.S.C. 154(b) by 49 days.

(21) Appl. No.: 10/385,340

(22) Filed: Mar. 10, 2003

(65) Prior Publication Data

US 2004/0062171 A1 Apr. 1, 2004

(30) Foreign Application Priority Data

Sep. 27, 2002 (TW) ........................................ 91215363 U

(51) Int. Cl.⁷ .......................... G11B 17/03; G11B 33/02
(52) U.S. Cl. ..................................... 720/600; 369/75.11
(58) Field of Search ....................... 720/600; 369/75.11, 369/75.21, 77.11, 77.21, 75.1, 75.2, 77.1, 77.2

(56) References Cited

U.S. PATENT DOCUMENTS 5,583,834 A * 12/1996 Kanada et al. ............. 369/13.2
6,388,980 B2 * 5/2002 Otani et al. .................. 369/219
6,665,254 B2 * 12/2003 Fukasawa ................... 369/75.2

* cited by examiner

Primary Examiner—Allen Cao
(74) Attorney, Agent, or Firm—Thomas, Kayden, Horstemeyer & Risley

(57) ABSTRACT

A locking mechanism of an external optical disk drive. The locking mechanism of an external optical disk drive with a cover and an upper housing comprises a curved extension portion, a fixing support, a gear mount, a motor, and a switch. The curved extension portion includes two posts and is positioned at the cover. The fixing support is fixed on upper housing and the cover is pivotally coupled to the upper housing. The gear mount is positioned on the upper housing and includes a gear train. The motor is fixed on the gear mount and connected to and driving the gear train. The switch sends command to stop or start the motor when any one of the posts contacts the switch.

10 Claims, 7 Drawing Sheets

LOCKING MECHANISM OF EXTERNAL OPTICAL DISK DRIVE

BACKGROUND OF THE INVENTION

1. Field of the Invention

The present invention relates to an optical disk drive, and more particularly to an external optical disk drive with a locking mechanism for releasing or locking its cover.

2. Description of the Related Art

An optical disk drive has an independent housing (referred to as an external optical disk drive), and is connected to a host computer via a signal cable to transmit data to the computer system. In addition, the external optical disk drive may transmit data to the users via an audio cable.

In prior art, the conventional disk loading and disk ejection methods include disk-tray type and cover-lifting type. Regarding the disk-tray type disk drive, the optical disk can be placed on the disk tray when a disk tray motor pulls the disk tray to what so called pull-out position. As shown in FIG. 1, the disk-tray optical disk drive includes a rectangular-shaped slit 11 surrounding the disk tray. However, due to the slit 11, the disk tray may be jammed by foreign objects during loading and ejection of the optical disk. Besides, the cover-lifting optical disk drive is normally applied to multimedia playback device. FIG. 2 and FIG. 3 show a conventional locking mechanism for a cover-lifting optical disk drive. The cover-lifting optical disk drive includes a cover 100 and a lower housing assembly 200. The cover 100 includes an opening 101 at its front edge, a rod 102 extending downwardly the front edge and beside the opening 101, and a rotary shaft 103 at its rear edge. The rotary shaft 103 is pivotally coupled to the lower housing assembly 200 so that the cover 100 can be pivoted with respect to the lower cover assembly 200. To effectively utilize the space occupied by the optical disk drive, the rotary shaft 103 is not located at a central portion of the rear edge of the cover 100. Further, the hook 300 engages with the opening 101 for the purpose of securing the cover 100 to the lower housing assembly 200. When the cover 100 is locked, a force F is applied to the rod 102 of the cover 100 by a torsion spring 400. As described above, the force F of the torsion spring 400 is applied to the rod 102 that is not located at the central portion of the front edge of the cover 100. Thus, the rotary shaft 103 that is slightly open. Due to a displacement D at the front edge of the cover 100, the cover 100 is deformed. The deformation of cover 100 may be aggravated during transport when environmental temperature is high, thereby rendering the finished product unusable prior to selling.

Accordingly, there is a need to develop a locking mechanism for use in an external optical disk drive.

SUMMARY OF THE INVENTION

It is an object of the present invention to provide a locking mechanism for an external optical disk drive that can effectively eliminate the deformation of a cover.

It is another object of the present invention to provide an external optical disk drive that a locking mechanism is used to secure a cover smoothly.

Accordingly, the present invention provides a locking mechanism for an external optical disk drive without additional torsion spring. In one embodiment of the present invention, the locking mechanism is disposed under the cover and includes a curved extension portion, a motor and a gear set. The gear set is driven by the motor to drive the curved extension portion of the cover, thereby opening the cover.

Thus, the object of the present invention is to provide an external optical disk drive without deformation, such that both quality and appearance of the cover are improved.

DESCRIPTION OF THE DRAWINGS

For a better understanding of the present invention, reference is made to a detailed description to be read in conjunction with the accompanying drawings, in which.

DETAILED DESCRIPTION OF THE INVENTION

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Although the embodiments of the present invention are described below in connection with a cover-lifting optical disk drive, the present invention can be applied to all optical disk drive, including but not limited to CD-ROM drives, CD-RW drives, DVD-R/RW drives, COMBO drives, car audio players, as well as all other optical media recorders and players.

Figure 1:
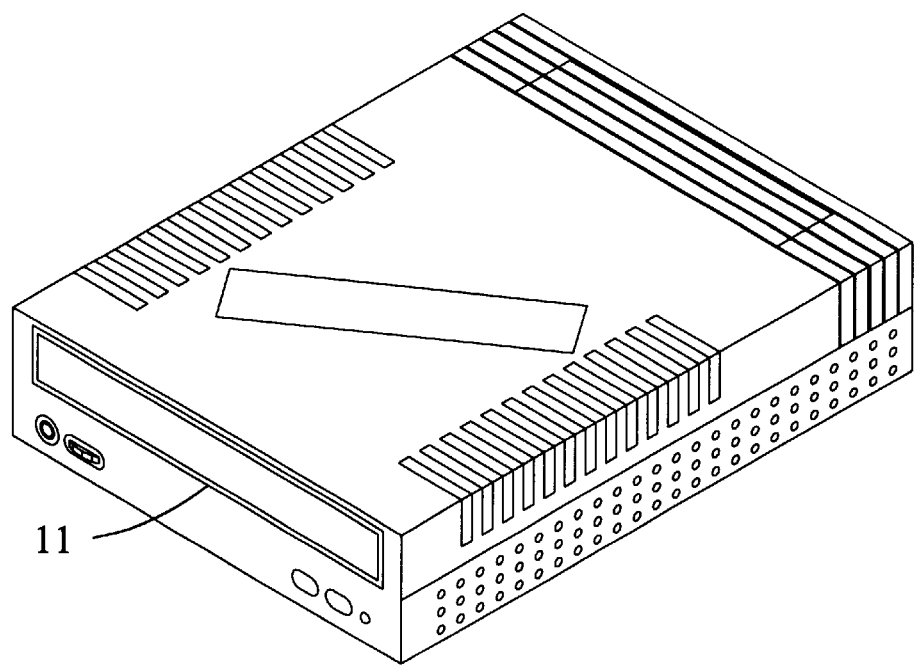
FIG. 1 is a perspective view of a conventional disk-tray optical disk drive.
Figure 2:
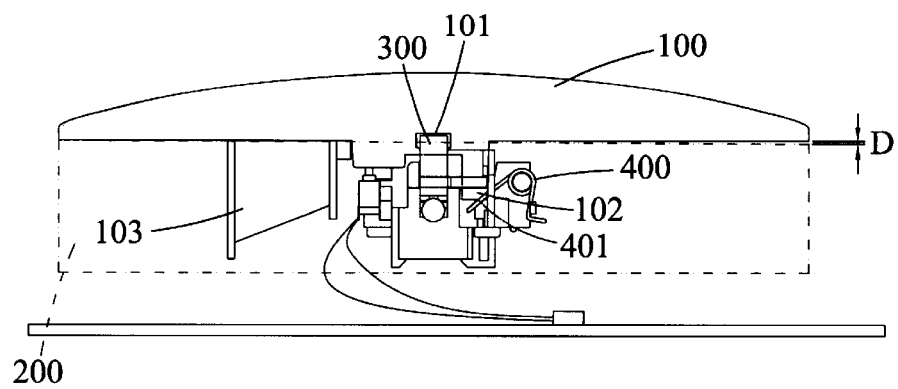
FIG. 2 is a front perspective view of a conventional cover-lifting optical disk drive.
Figure 3:
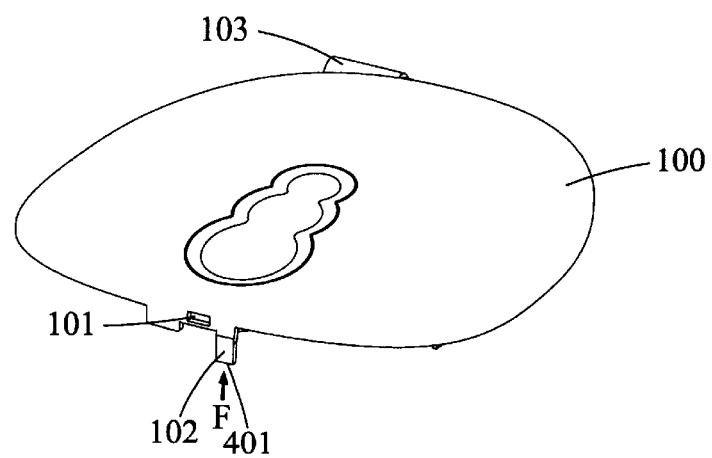
FIG. 3 is a perspective view of a cover of the optical disk drive of FIG. 2.
Figure 4:
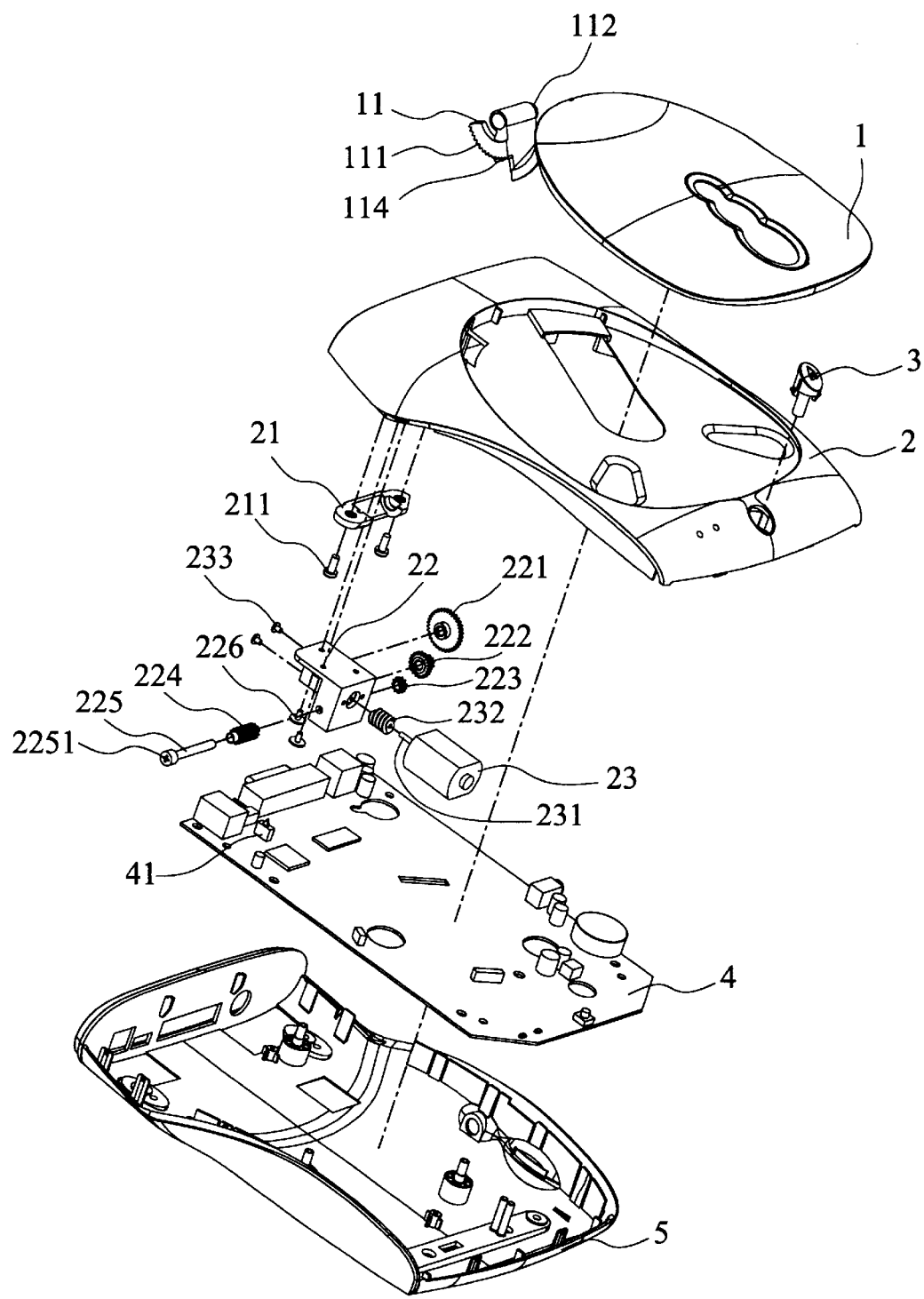
FIG. 4 is an exploded perspective view of an optical disk drive according to the present invention.

FIG. 4 best illustrates the interconnections of the various components of the optical disk drive in accordance with the present invention. Referring to FIG. 4, the optical disk drive includes a cover 1, an upper housing 2, an ejection button 3, a printed circuit board (PCB) 4 and a lower housing 5. The ejection button 3 is positioned at the upper housing 2 and is used to eject the cover 1. The PCB 4 is disposed in the lower housing 5, and the upper housing 2 is positioned at the lower housing 5.

Figure 5:
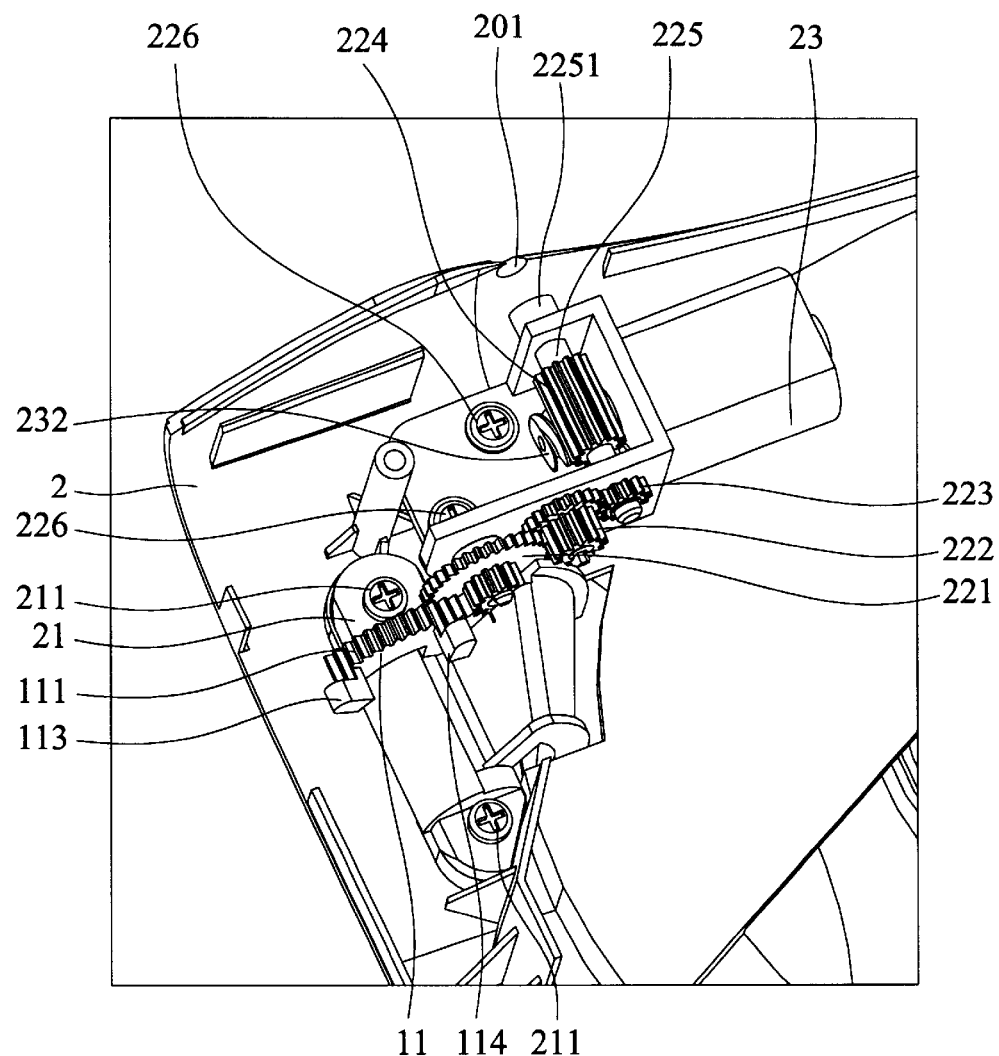
FIG. 5 is a bottom perspective view of the gear set of the optical disk drive of FIG. 4.

As shown in FIG. 4, the locking mechanism according to the present invention includes a curved extension portion 11, a fixing support 21, a gear mount 22, a motor 23 and a switch 41. The curved extension portion 11 is defined at the back edge of the cover 1 and integrally formed with the cover 1. A gear rack 111 is integrally formed with the curved extension portion 11. A front post 113 (as shown in FIG. 5) and a rear post 114 are respectively disposed on both ends of the gear rack 111. The fixing support 21 is fixed on the bottom surface of the upper housing 2 by first screws 211. The cover 1 is connected to a fixing support 21 by the cover shaft 112. Thus, the cover 1 is rotatably coupled to the upper housing 2.

Figure 6:
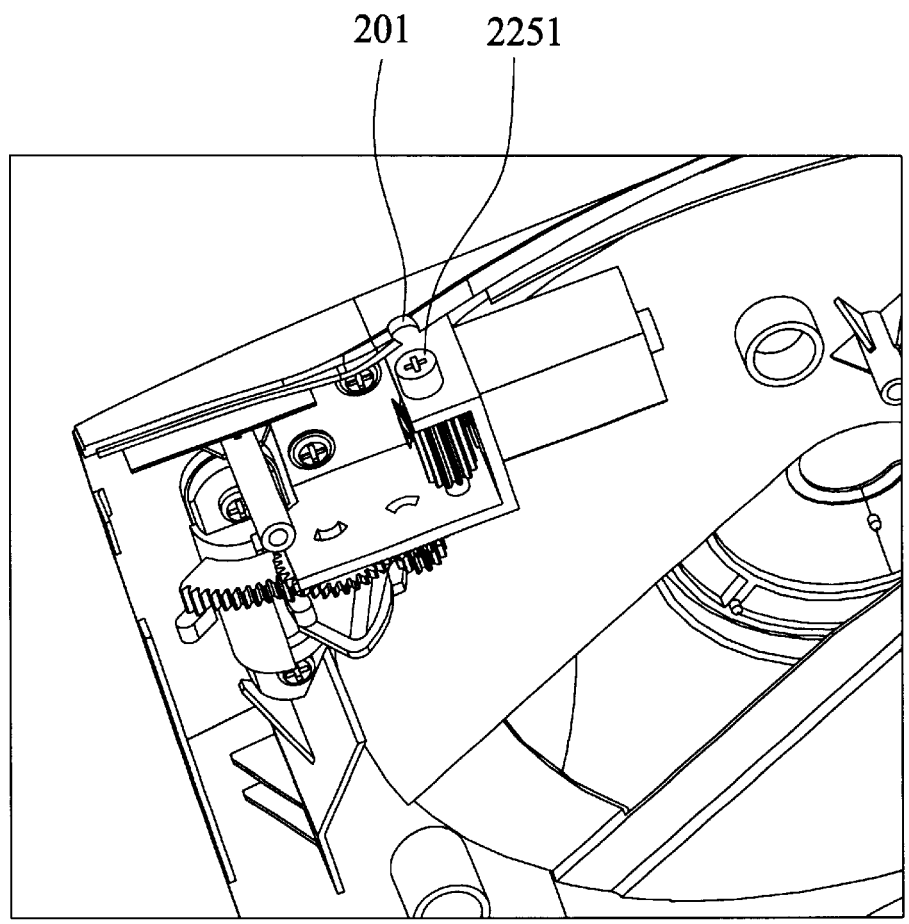
FIG. 6 is another bottom perspective view of the gear set of the optical disk drive of FIG. 4.

Further referring to FIGS. 4–6, the gear mount 22 is fixed on the bottom surface of the upper housing 2 by second screws 226. A motor 23 is fixed on the gear mount 22 by third screws 233, and the motor 23 has a motor shaft 231. A worm 232 connects the motor shaft 231 of the motor 23 and meshes with a worm gear 224 that is positioned within the gear mount 22. Besides, the worm gear 224 is adapted to receive a gear shaft 225. An emergency ejection button 2251 is integrally formed with the gear shaft 225 and positioned at one end of the gear shaft 225. The other end of the gear shaft 225 is connected with a gear train. In this embodiment, the gear train is made of three spur gears. The gear shaft 225 is connected with a third spur gear 223, and then third spur gear 223 meshes with a second spur gear 222. Besides, the second spur gear 222 meshes with a first spur gear 221. The first spur gear 221 meshes with the gear rack 111 of the curved extension portion 11. Thus, the gear train drives the curved extension portion 11 of the cover 1 during loading or ejection of the optical disk.

Furthermore, the spur gears can be replaced by a plurality of bevel gears (not shown). When the motor 23 is operated, it transmits force to the worm 232 to drive the worm gear 224. The motor 23 further drives the third spur gear 223 due to the engagement of the motor 23 and the gear train. Thus, the locking mechanism opens the cover.

Figure 8:
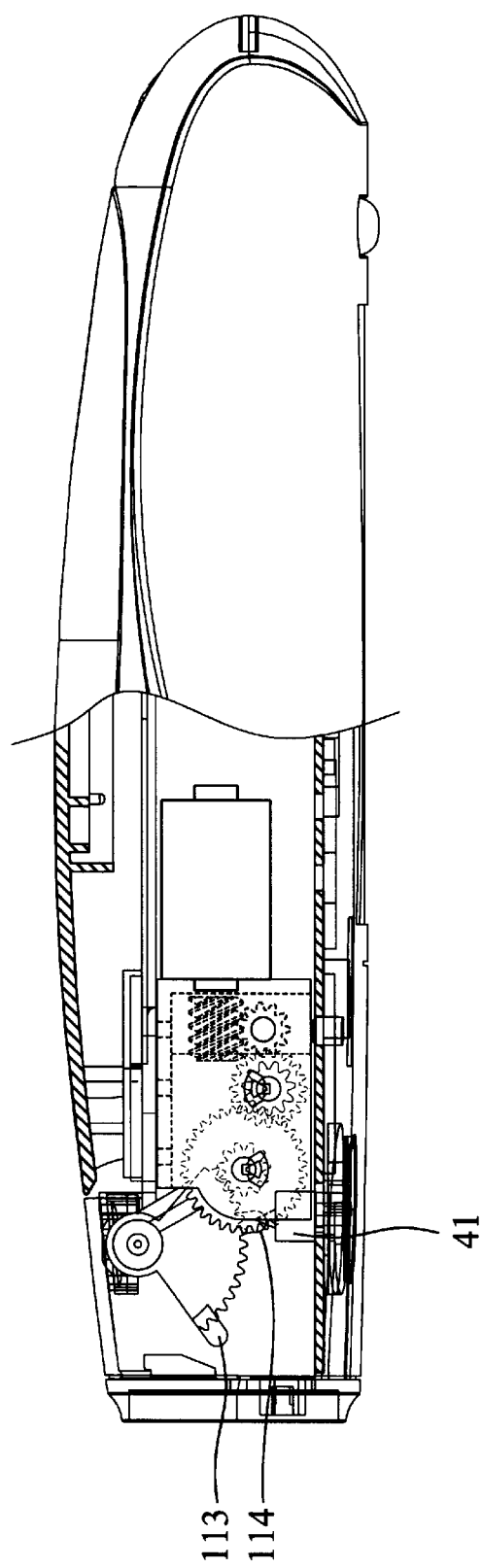
FIG. 8 is a partial cross-section of the optical drive disk drive of FIG. 4.

Referring to FIGS. 4 and 8, when the user pushes the ejection button 3 to open the cover, the motor 23 drives the worm 232 and the worm gear 224. The motor 23 transmits a force to drive the gear train that consists of the first spur gear 221, the second spur gear 222 and the third spur gear 223. The rear post 114 of the curved extension portion 11 moves away from the switch 41, and the rear post 114 does not contact the switch 41. Thus, the switch 41 sends a signal to microcontroller (MCU) (not shown) installed on the PCB 4 and indicates the ejection button 3 is already activated. Besides, the motor 23 continues to drive the worm 232 and the cover 1 pivots about the cover shaft 112. Until the front post 113 contacts the switch 41, the switch 41 is triggered and sends a signal to the MCU. The MCU receives the signal from the switch 41 and MCU instructs the motor 23 to stop. Then, the cover is opened by the motor 23 and the user can manually place the optical disk into the optical disk drive.

Referring to FIGS. 4 and 8, when the user pushes the ejection button 3 to close the cover, the motor 23 rotates and drives the worm 232 and the worm gear 224 in a reverse direction (compared to open the cover). Similarly, the motor 23 transmits a force to drive the gear train in the reverse direction. The front post 113 of the curved extension portion 11 is disengaged from the switch 41, and the front post 114 does not contact the switch 41. Thus, the switch 41 sends a signal to microcontroller (MCU) (not shown) installed on the PCB 4 and indicates the ejection button 3 is already activated. Besides, the motor 23 continues to drive the worm 232 in the reverse direction and the cover 1 pivots about the cover shaft 112. Until the rear post 114 contacts the switch 41, the switch 41 is triggered and sends a signal to the MCU. The MCU receives the signal from the switch 41 and MCU instructs the motor 23 to stop. Then, the cover is closed by the motor 23 and the optical disk drive is ready for reading the optical disk.

Figure 7:
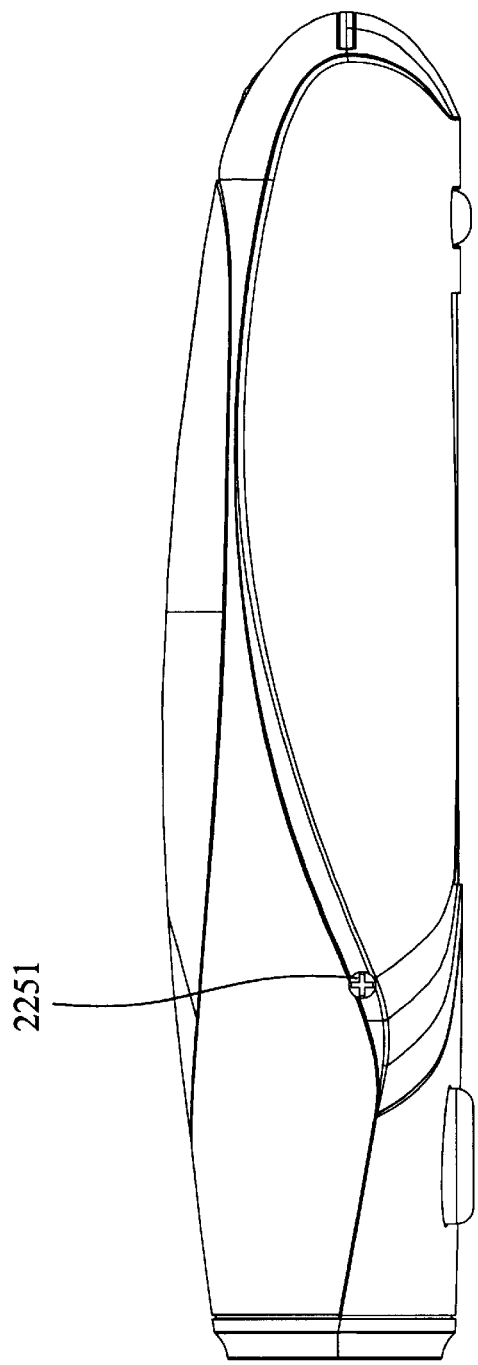
FIG. 7 is a side perspective view of the optical drive disk drive of FIG. 4.

Referring to FIGS. 5–7, a hole 201 is positioned the upper housing 2 and corresponds to the emergency ejection button 2251. When the host computer crashes or the optical disk malfunctions (For example, the motor 23 fails to rotate), the user can use, a screwdriver to manually rotate the emergency ejection button 2251 and the gear shaft 225 extends through the hole 201. Thus, the user can manually open the cover 1 by the emergency ejection button 2251.

The advantage of the present invention is that the apparatus does not require an additional torsion spring, and thus, the cost of the apparatus is reduced effectively.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A locking mechanism of an external optical disk drive with a cover and an upper housing, comprising:

a curved extension portion, including two posts and positioned at the cover;

a fixing support, being fixed on the upper housing and the cover being pivotally coupled to the upper housing;

a gear mount, positioned on the upper housing and including a gear train;

a motor, fixed on the gear mount and connected to and driving the gear train; and a switch, sending command to stop or start the motor when any one of the posts contacts the switch.

2. The locking mechanism of claim 1, wherein the two posts are respectively disposed on both ends of the curved extension portion.

3. The locking mechanism of claim 1, wherein a gear rack is integrally formed with the curved extension portion.

4. The locking mechanism of claim 1, wherein the gear train comprises a worm, a worm gear, a gear shaft and a plurality of spur gears, and the worm is connected to the gear shaft of the motor, thereby the motor driving the plurality of spur gears through the worm, the worm gear and the gear shaft.

5. The locking mechanism of claim 1, wherein the gear train comprises a worm, a worm gear, a gear shaft and a plurality of bevel gears, and the worm is connected to the gear shaft of the motor, thereby the motor driving the plurality of bevel gears through the worm, the worm gear and the gear shaft.

6. The locking mechanism of claim 4, wherein the plurality spur gears comprise a first spur gear, a second spur gear, and a third spur gear connected to the motor.

7. The locking mechanism of claim 5, wherein the plurality bevel gears comprise a first bevel gear, a second bevel gear, and a third bevel gear connected to the motor.

8. A locking mechanism of an external optical disk drive with a cover and an upper housing, comprising:

a curved extension portion, including two posts and positioned at the cover;

a fixing support, being fixed on upper housing and the cover being pivotally coupled to the upper housing;

a gear mount, positioned on the upper housing and including a worm, a worm gear and a gear shaft;

a motor, fixed on the gear mount and connected to and driving the worm, the worm gear and the gear shaft; and a switch, sending command to stop or start the motor when any one of the posts contacts the switch.

9. The locking mechanism of claim 8, wherein the two posts are respectively disposed on both ends of the curved extension portion.

10. The locking mechanism of claim 8, wherein a gear rack is integrally formed with the curved extension portion.

* * * * *